United States Patent
Kinpara et al.

(10) Patent No.: US 8,380,015 B2
(45) Date of Patent: Feb. 19, 2013

(54) OPTICAL CONTROL DEVICE

(75) Inventors: Yuhki Kinpara, Chiyoda-ku (JP);
Masayuki Ichioka, Chiyoda-ku (JP);
Junichiro Ichikawa, Chiyoda-ku (JP);
Satoshi Oikawa, Chiyoda-ku (JP);
Yasuhiro Ishikawa, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 265 days.

(21) Appl. No.: 12/798,044

(22) Filed: Mar. 29, 2010

(65) Prior Publication Data

US 2010/0266234 A1 Oct. 21, 2010

(30) Foreign Application Priority Data

Mar. 31, 2009 (JP) .................. 2009-088508

(51) Int. Cl.
*G02F 1/035* (2006.01)
*G02F 1/295* (2006.01)
(52) U.S. Cl. ....... 385/2; 385/8; 385/9; 385/40; 359/245; 359/246; 359/254
(58) Field of Classification Search .............. 385/2, 8, 385/9, 40; 359/245, 246, 254
See application file for complete search history.

(56) References Cited

U.S. PATENT DOCUMENTS

| | | | |
|---|---|---|---|
| 4,737,003 A | 4/1988 | Matsumura et al. | |
| 5,572,610 A * | 11/1996 | Toyohara | 385/14 |
| 5,757,990 A | 5/1998 | Miyakawa | |
| 6,606,424 B2 * | 8/2003 | Ooi et al. | 385/3 |
| 6,961,494 B2 * | 11/2005 | Tanaka | 385/40 |
| 6,999,223 B2 * | 2/2006 | Seino et al. | 359/254 |
| 7,133,578 B2 * | 11/2006 | Doi | 385/3 |
| 8,135,242 B2 * | 3/2012 | Sugiyama | 385/2 |
| 2002/0186912 A1 | 12/2002 | Seino et al. | |
| 2008/0212915 A1 | 9/2008 | Ichikawa et al. | |

FOREIGN PATENT DOCUMENTS

| | | |
|---|---|---|
| JP | 7-049511 A | 2/1995 |
| JP | 2583480 B2 | 2/1997 |
| JP | 2746216 B2 | 5/1998 |
| JP | 2000-056282 A | 2/2000 |
| JP | 3139009 A | 2/2001 |
| JP | 3139009 B2 | 2/2001 |
| JP | 2002-182172 A | 6/2002 |
| JP | 2008-116865 A | 5/2008 |

* cited by examiner

*Primary Examiner* — Daniel Petkovsek
(74) *Attorney, Agent, or Firm* — Chapman and Cutler LLP

(57) ABSTRACT

The present invention relates to an optical control device capable of achieving an accurate match of modulation timing and modulation intensity between optical waves propagating through optical waveguides disposed between a plurality of signal electrodes in an optical control device using an anisotropic dielectric substrate.

10 Claims, 3 Drawing Sheets

OPTICAL CONTROL DEVICE

BACKGROUND OF THE INVENTION

1. Field of the Invention

The present invention relates to an optical control device, and more particularly, to an optical control device using an anisotropic dielectric substrate.

Priority is claimed on Japanese Patent Application No. 2009-088508, filed Mar. 31, 2009, the entire contents of which are incorporated herein by reference.

2. Description of Related Art

In the field of optical communications or optical measurement, optical control devices have become commercially available in which an optical waveguide, a signal electrode, and a ground electrode are formed on a substrate having an electro-optical effect, and a high-frequency signal is applied to the signal electrode to modulate an optical wave propagating through the optical waveguide.

For realization of high-speed bulk data transfers and various types of optical modulation, the shape of the optical waveguides used in the optical control device has become complicated. Thus, the number of signal electrodes for controlling the optical waveguides has tended to increase. For example, in modulation methods such as DQPSK (Differential Quadrature Phase Shift Keying) or SSB (Single Side Band) as disclosed in Patent Document 1, as shown in FIG. 1, a nested waveguide is used in which another Mach-Zehnder waveguides (sub Mach-Zehnder waveguides) 3 are incorporated into two branch waveguides 2 that constitute one Mach-Zehnder waveguide (main Mach-Zehnder waveguide) 1. Signal electrodes 4 are disposed so as to interact with the Mach-Zehnder waveguides 3. Moreover, for realization of further higher-speed modulation, other modulation methods have been proposed such as polarization multiplexing in which the structures for DQPSK are arranged in parallel to each other so as to perform respective modulation with orthogonal polarization waves, or D8PSK or D16PSK that further divides phase information.

Moreover, optical control devices in which signal path switching is achieved in an optical waveguide have been studied. Examples of such optical control devices include an optical control device that uses a directional coupler as disclosed in Patent Document 2, an optical control device as disclosed in Patent Document 3, in which arms have a large refractive index difference so that light is concentrated on an arm having a high refractive index, an optical control device that uses a total reflection as disclosed in Patent Document 4, and an optical control device that uses a Mach-Zehnder interferometer as disclosed in Patent Document 5.

However, when there is a plurality of signal electrodes, it is necessary that electrical signals applied to the respective signal electrodes arrive at an acting portion (between the points b and c in FIG. 1) S where the electrical signals interact with the optical waves propagating through the optical waveguides at a predetermined time. For this reason, it is essential to consider the propagation time of the high-frequency signal through an input-side signal electrode portion I in each signal electrode ranging from a signal input terminal portion 5 (point a) formed by an electrode pad to a starting point (point b) of the acting portion S.

An example of a method of considering the propagation time of the electrical signal in the input-side signal electrode portion I includes a method of adjusting the timing of inputting the electrical signal to the signal input terminal portion 5 considering the length of the input-side signal electrode portion I of each signal electrode and a method of adjusting the lengths of the input-side signal electrode portions I of the signal electrodes so as to be the same as disclosed in Patent Document 6 or 7.

On the other hand, when material (anisotropic dielectric substrate) having anisotropy in dielectric constant is used, since the high-frequency refractive index also has anisotropy, the propagation speed, impedance and propagation loss of the electrical signals may change depending on propagation direction. For this reason, modulation electrodes may be formed on a substrate having such an electro-optical effect that the dielectric constant is different in each orthogonal direction parallel to the substrate surface. In this case, for example, even when the effective electrode lengths of the input-side signal electrode portions I of the respective signal electrodes are adjusted to be the same, since the electrical reflection and propagation loss resulting from an impedance mismatch is different in each modulation electrode, the modulation characteristics will be deteriorated. In addition, since the refractive index of the electrical signal changes depending on the frequency of the electrical signal, there is a problem in that when electrical signals having different frequencies are input to modulation electrodes having the same shape, the modulation start time is different in each modulation electrode.

LIST OF PATENT CITATIONS

Patent Document 1: Japanese Unexamined Patent Application Publication No. 2008-116865
Patent Document 2: Japanese Patent No. 3139009
Patent Document 3: Japanese Patent No. 2796216
Patent Document 4: Japanese Patent No. 2583480
Patent Document 5: Japanese Unexamined Patent Application Publication No. 7-49511
Patent Document 6: Japanese Unexamined Patent Application Publication No. 2000-056282
Patent Document 7: Japanese Unexamined Patent Application Publication No. 2002-182172

SUMMARY OF THE INVENTION

An object of the present invention is to solve the above described problems and provide an optical control device capable of achieving an accurate matching of modulation timing for optical waves which is propagating through optical waveguides disposed between a plurality of signal electrodes, input signal intensity resulting from a propagation loss, and impedance in an optical control device using an anisotropic dielectric substrate.

The optical control device in the present invention means a device that performs optical modulation and optical-path switching by an interaction between an optical wave and an electric field.

The invention according to a first aspect of the present invention provides an optical control device including; an anisotropic dielectric substrate; and optical waveguides formed on the substrate so as to cause optical waves propagating through the optical waveguides to interact with electrical signals propagating through modulation electrodes. The modulation electrodes include a plurality of signal electrodes and a ground electrode disposed around the signal electrodes. The plural signal electrodes have respective electrode portions which are disposed in directions where the dielectric constant of the substrate is different. Signal electrodes ranging from signal input terminal portions of the signal electrodes to a point where the interaction between the electrical signals and the optical waves propagating through the optical waveguides starts are used as input-side signal electrode portions. The modulation electrodes including the plurality of signal electrodes have matched impedance, and the sum of effective electrode lengths of the input-side signal electrode portions, which are the products of physical electrode lengths and effective refractive indices of the electrical signals, is the same in each of the directions where the dielectric constant is different.

The invention according to a second aspect of the present invention provides the optical control device according to the first aspect of the present invention, characterized in that the sum of physical electrode lengths of the input-side signal electrode portions in the modulation electrodes including the plurality of signal electrodes is the same in each of the directions where the dielectric constant is different.

The invention according to a third aspect of the present invention provides the optical control device according to the first or second aspect of the present invention, characterized in that the optical control device has a loss-reduction portion for reducing an electrical loss in at least apart of the input-side signal electrode portions in the modulation electrodes including the plurality of signal electrodes, and the sum of effective electrode lengths of the loss-reduction portion is the same in each of the directions where the dielectric constant is different.

The invention according to a fourth aspect of the present invention provides the optical control device according to any one of the first to third aspects of the present invention, characterized in that the optical waveguides have such a shape that a plurality of Mach-Zehnder waveguides is arranged in parallel, and the signal electrodes are electrodes that supply electrical signals for modulating the optical waves propagating through a branch waveguide of each of the Mach-Zehnder waveguides.

The invention according to a fifth aspect of the present invention provides the optical control device according to any one of the first to third aspects of the present invention, characterized in that the optical waves propagating through the optical waveguides interact with the electrical signals propagating through the signal electrodes, thus switching optical path.

In accordance with the invention according to the first aspect of the present invention, the optical control device includes an anisotropic dielectric substrate; and optical waveguides formed on the substrate so as to cause optical waves propagating through the optical waveguides to interact with electrical signals propagating through modulation electrodes. The modulation electrodes include a plurality of signal electrodes and a ground electrode disposed around the signal electrodes. The plural signal electrodes have respective electrode portions which are disposed in directions where the dielectric constant of the substrate is different. Signal electrodes ranging from signal input terminal portions of the signal electrodes to a point where the interaction between the electrical signals and the optical waves propagating through the optical waveguides starts are used as input-side signal electrode portions. The modulation electrodes including the plurality of signal electrodes have matched impedance, and the sum of effective electrode lengths of the input-side signal electrode portions, which are the products of physical electrode lengths and effective refractive indices of the electrical signals, is the same in each of the directions where the dielectric constant is different. Due to this configuration, the impedance, signal intensity, and effective electrode length in each propagation direction of the modulation signal are the same among all signal electrodes. As a result, the signal electrodes have the same high-frequency characteristics. For this reason, even when the frequency of the modulation signal changes, it is possible to achieve an accurate matching of modulation timing and modulation intensity in the acting portions of the signal electrodes.

The "input-side signal electrode portion" in the present invention means signal electrodes ranging from a signal input terminal portion of the signal electrodes to an acting portion that performs modulation on the optical wave propagating through the optical waveguide.

In accordance with the invention according to the second aspect of the present invention, the sum of physical electrode lengths of the input-side signal electrode portions in the modulation electrodes including the plurality of signal electrodes is the same in each of the directions where the dielectric constant is different. Due to this configuration, if a refractive index is constant in each direction where the dielectric constant is different, the propagation time of the signal electrodes will be the same.

In accordance with the invention according to the third aspect of the present invention, the optical control device has a loss-reduction portion for reducing electrical loss in at least a part of the input-side signal electrode portions in the modulation electrodes including the plurality of signal electrodes, and the sum of effective electrode lengths of the loss-reduction portion is the same in each of the directions where the dielectric constant is different. Due to this configuration, since the propagation loss in each propagation direction of the modulation signal becomes the same, it is possible to achieve an accurate matching of the modulation intensity in the acting portions of the signal electrodes.

In accordance with the invention according to the fourth aspect of the present invention, the optical waveguides have such a shape that a plurality of Mach-Zehnder waveguides is arranged in parallel, and the signal electrodes are electrodes that supply electrical signals for modulating the optical waves propagating through a branch waveguide of each of the Mach-Zehnder waveguides. Due to this configuration, it is possible to adjust the modulation timing or the modulation intensity in the acting portions of the signal electrodes of an optical control device in which a plurality of Mach-Zehnder waveguides is arranged in parallel, such as an optical control device having nested waveguides for DQPSK or SSB modulation or an optical control device having waveguides with a further nested structure. Therefore, it is possible to provide a wideband optical control device.

In accordance with the invention according to the fifth aspect of the present invention, the optical waves propagating through the optical waveguides interact with the electrical signals propagating through the signal electrodes, thus switching optical path. Due to this configuration, it is possible to adjust the signal timing or the signal intensity in an optical control device that uses a directional coupler, an optical control device in which light is concentrated on an arm having a high refractive index, an optical control device that uses a total reflection, or an optical control device that uses a Mach-Zehnder interferometer. Therefore, it is possible to provide a fast optical-path switching device.

DETAILED DESCRIPTION OF THE INVENTION

Hereinafter, an optical control device according to the present invention will be described in detail.

A first feature of the present invention is an optical control device including an anisotropic dielectric substrate; and optical waveguides formed on the substrate so as to cause optical waves propagating through the optical waveguides to interact with electrical signals propagating through modulation electrodes. The modulation electrodes include a plurality of signal electrodes and a ground electrode disposed around the signal electrodes. The plural signal electrodes have respective electrode portions which are disposed in directions where the dielectric constant of the substrate is different. Signal electrodes ranging from signal input terminal portions of the signal electrodes to a point where the interaction between the electrical signals and the optical waves propagating through the optical waveguides starts are used as input-side signal electrode portions. The modulation electrodes including the plurality of signal electrodes have matched impedance, and the sum of effective electrode lengths of the input-side signal electrode portions, which are the products of physical electrode lengths and effective refractive indices of the electrical signals, is the same in each of the directions where the dielectric constant is different.

The anisotropic dielectric substrate to which the present invention is applied means a substrate of which the dielectric constant is different in each direction of the substrate, and typically a substrate of which the dielectric constant is different in each direction of a crystal axis. For example, in a substrate (X-cut substrate) cut along a plane of which the normal vector is the X axis of $LiNbO_3$ crystals, the Y and Z axes become the orthogonal directions parallel to the substrate surface. Therefore, the dielectric constants of the substrate will be different on the Y and Z axes. It should be noted that in the anisotropic dielectric substrate in the present invention, the directions where the dielectric constant is different are not necessarily the orthogonal directions parallel to the substrate surface.

Figure 1:
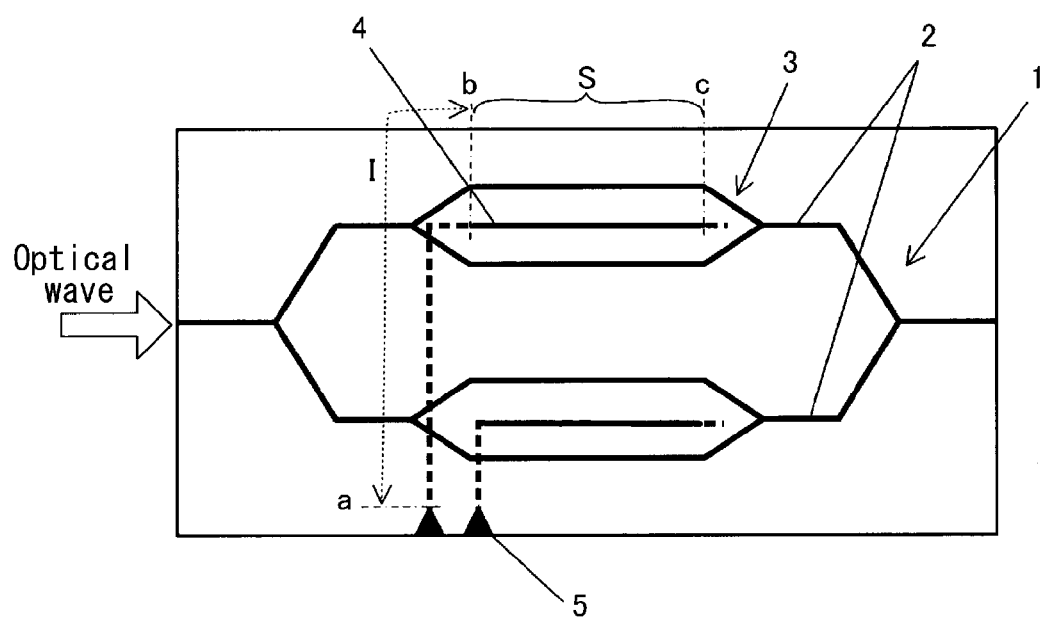
FIG. 1 is a diagram showing an example of an optical control device having a nested waveguide.
Figure 2:
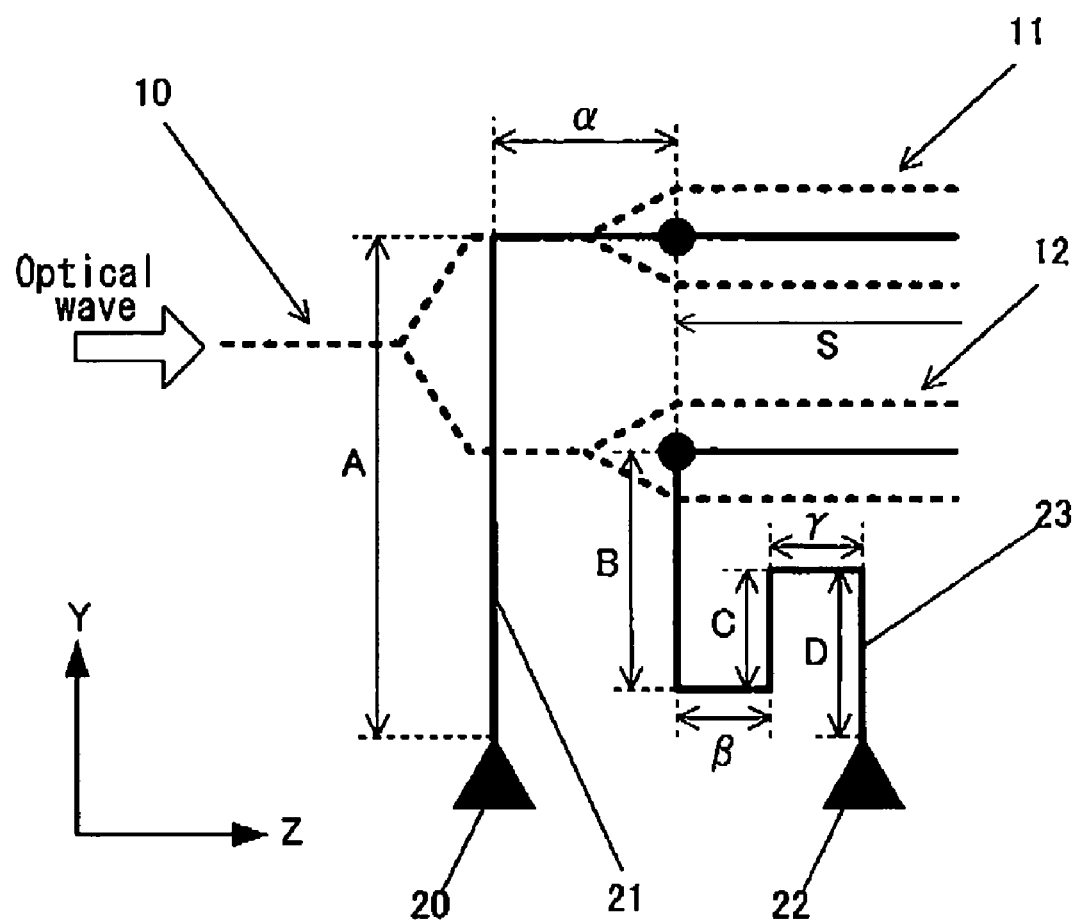
FIG. 2 is a diagram showing a basic principle of an optical control device according to the present invention.

FIG. 2 is a diagram showing a basic principle of the optical control device according to the present invention. On a substrate disposed on the Y-Z plane, optical waveguides 10 to 12 depicted by dotted lines are formed. Similar to FIG. 1, the optical waveguides form a part of a nested waveguide in which two sub Mach-Zehnder waveguides 11 and 12 are respectively incorporated into two main branch waveguides of a main Mach-Zehnder waveguide 10.

In FIG. 2, a case where there are two signal electrodes (21 and 23) is shown, and a ground electrode is not shown to simplify the drawing. When an X-cut substrate is used, typically, an electric field formed by a signal electrode and a ground electrode disposed so as to sandwich an optical waveguide is used for modulating an optical wave propagating through the optical waveguide. A region where the electric field formed by a modulation electrode composed of the signal electrode and the ground electrode acts on the optical wave propagating through the optical waveguide is referred to as an acting portion, and the region indicated by a symbol S in FIG. 2 corresponds to the acting portion.

The signal electrodes (21 and 23) has a so-called coplanar electrode arrangement in which the ground electrode is sandwiched so as to sandwich the signal electrodes in the input-side signal electrode portions ranging from electrode pads (20 and 22) serving as input-side signal electrode portions to the acting portion S.

The input-side signal electrode portion of each signal electrode shown in FIG. 2 is divided into a component extending in parallel to the Z-axis direction and a component extending in parallel to the Y-axis direction. Since the dielectric constant is different in the Z and Y-axis directions, the propagation speed and the propagation loss of the modulation signal are different. For this reason, in the present invention, the sum of effective electrode lengths of the input-side signal electrode portion in each direction perpendicular, to the Z and Y axes is the same among the respective signal electrodes. That is to say, the effective electrode length in the Z-axis direction of the input-side signal electrode portion of the signal electrode 21 is $\alpha$, and the effective electrode length in the Z-axis direction of the input-side signal electrode portion of the signal electrode 23 is $\beta+\gamma$. Moreover, the effective electrode length in the Y-axis direction of the signal electrode 21 is A, and the effective electrode length in the Y-axis direction of the signal electrode 23 is B+C+D.

In order to satisfy the conditions for the effective electrode length in the optical modulator of the present invention, the following equations should be satisfied.

Z-axis direction: $\alpha=\beta+\gamma$
Y-axis direction: $A=B+C+D$

Typically, the shape of a signal electrode is not bent at a right angle as shown in FIG. 2 but is drawn as a combination of straight lines and curves. This is because an abrupt change of direction may result in reflection of high-frequency signal at a bent portion, thus leading to deterioration in propagation signal intensity and quality. In an arbitrary curve as drawn in FIG. 3, the sum of the effective electrode lengths of the Z-axis components and the sum of the effective electrode lengths of the Y-axis components are calculated in a range from point a to point b. In this example, a change in coordinates of the curve is expressed as (f(t),g(t)), and t is a parameter changing in the range of the points a to b. A vector occupying the tangential direction of the curve is a derivative of the coordinates of the curve and can be expressed as (f'(t),g'(t)).

The sum (1) of the effective electrode lengths of the Z-axis components and the sum (2) of the effective electrode lengths of the Y-axis components are shown in Equation 1.

Formula 1

$$\frac{\int_a^b \sqrt{(f'(t))^2 + (g'(t))^2}\, dt \times \int_a^b g'(t)dt}{\int_a^b f'(t)dt + \int_a^b g'(t)dt} \quad (1)$$

$$\frac{\int_a^b \sqrt{(f'(t))^2 + (g'(t))^2}\, dt \times \int_a^b f'(t)dt}{\int_a^b f'(t)dt + \int_a^b g'(t)dt} \quad (2)$$

In order to adjust the propagation time or the propagation loss of signal electrodes having an arbitrary curve shape, the sum of the effective electrode lengths of the Z-axis components and the sum of the effective electrode lengths of the Y-axis components in the input-side signal electrode portion of each signal electrode are calculated from each equation of Formula 1, and the sums of each component are adjusted so as to be the same between the signal electrodes.

Figure 4:
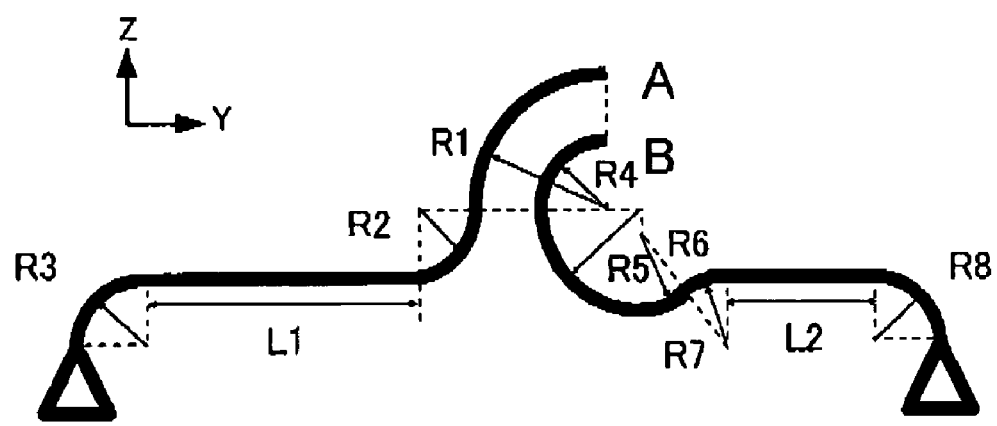
FIG. 4 shows an example of input-side signal electrode portions of two signal electrodes corresponding to the four branch waveguides of the nested waveguide shown in FIG. 1.

FIG. 4 shows an example of input-side signal electrode portions of two signal electrodes corresponding to the four branch waveguides of the nested waveguide shown in FIG. 1.

In order to decompose the effective electrode length into Y and Z-axis components and adjust the lengths, the signal electrodes ranging from input terminals of the lines A and B to an interaction starting point where modulation signals start interacting with waveguides are divided into circular arcs (R1 to R8) and straight lines (L1 and L2). The circular arcs R1, R2, and R3 are determined such that the effective electrode length of the Z-axis component of the line A becomes the minimum. For example, the length of the Z-axis component of the circular arc R1 is expressed as the equation given in Formula 2. Since Formula 2 is similarly applied to the circular arcs R2 and R3, the length of the Z-axis component of the line A is $\frac{1}{4} \times (R1+R2+R3)\pi$.

Formula 2

$$\frac{\int_0^{1/2\pi} R1 \times \sin\theta d\theta \times \int_0^{1/2\pi} R1 \times \sqrt{(\cos\theta d\theta)^2 + (\sin\theta d\theta)^2}\, d\theta}{\int_0^{1/2\pi} R1 \times \cos\theta d\theta + \int_0^{1/2\pi} R1 \times \sin\theta d\theta} = \frac{1}{4} R1\pi$$

The circular arcs R4 to R8 are determined so as to match the effective electrode length of the Z-axis component of the line B to the line A. When the circular arcs R4, R5, and R8 have an angle of 90°, the circular arc R6 has an angle of θ0, and the circular arc R7 has an angle of θ1, the light-receiving element of the Z-axis component can be matched to the value given by Formula 3.

Formula 3

$$\frac{1}{4}(R1+R2+R3)\pi = \frac{1}{4}(R4+R5+R8)\pi +$$

$$\frac{\int_0^{\theta 0} R6 \times \sin\theta d\theta \times \int_0^{\theta 0} R6 \times \sqrt{(\cos\theta d\theta)^2 + (\sin\theta d\theta)^2}\, d\theta}{\int_0^{\theta 0} R6 \times \cos\theta d\theta + \int_0^{\theta 0} R6 \times \sin\theta d\theta} +$$

$$\frac{\int_0^{\theta 1} R7 \times \sin\theta d\theta \times \int_0^{\theta 1} R7 \times \sqrt{(\cos\theta d\theta)^2 + (\sin\theta d\theta)^2}\, d\theta}{\int_0^{\theta 1} R7 \times \cos\theta d\theta + \int_0^{\theta 0} R7 \times \sin\theta d\theta}$$

Subsequently, when the lengths of the Z-axis components are matched, the Y-axis components are matched. The Y-axis components can be matched to the value given by Formula 4.

Formula 4

$$L1 - L2 = \frac{1}{4}(R4+R5+R8)\pi - \frac{1}{4}(R1+R2+R3)\pi +$$

$$\frac{\int_0^{\theta 0} R6 \times \cos\theta d\theta \times \int_0^{\theta 0} R6 \times \sqrt{(\cos\theta d\theta)^2 + (\sin\theta d\theta)^2}\, d\theta}{\int_0^{\theta 0} R6 \times \cos\theta d\theta + \int_0^{\theta 0} R6 \times \sin\theta d\theta} +$$

$$\frac{\int_0^{\theta 1} R7 \times \cos\theta d\theta \times \int_0^{\theta 1} R7 \times \sqrt{(\cos\theta d\theta)^2 + (\sin\theta d\theta)^2}\, d\theta}{\int_0^{\theta 1} R7 \times \cos\theta d\theta + \int_0^{\theta 0} R7 \times \sin\theta d\theta}$$

An optical control device having the input-side signal electrode portion as shown in FIG. 4 was produced actually. The produced optical control device had signal electrodes having a dimension adjusted such that the sum of the physical electrode length of the Z-axis component was 393 µm, and the sum of the physical electrode length of the Y-axis was 1784 µm. When the optical control device adjusted thus was operated, the optical waves output from the optical control device showed improved jitter characteristics compared to a conventional one. This improvement may result from the suppression of chirp due to the high-precision matching of modulation timing or modulation intensity among the signal electrodes.

Next, a second feature of the present invention will be described.

The second feature of the present invention is that the optical control device has a loss-reduction portion for reducing an electrical loss in at least a part of the input-side signal electrode portions, and the sum of effective electrode lengths of the loss-reduction portion is the same in each of the directions where the dielectric constant is different.

Figure 3:
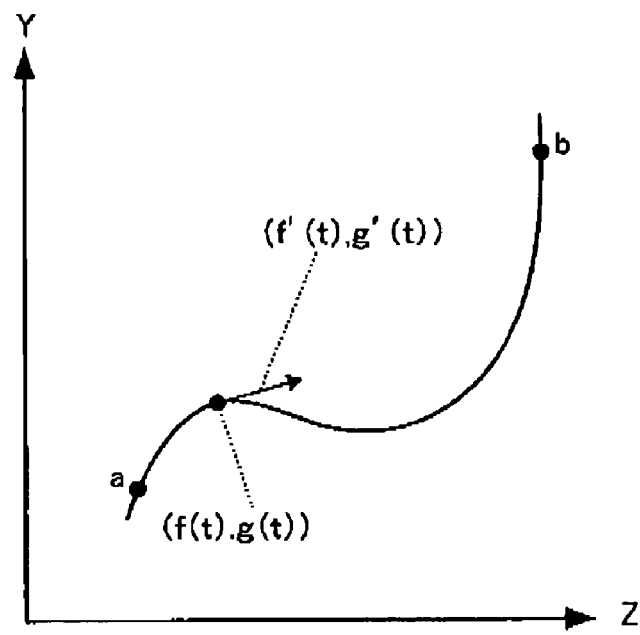
FIG. 3 is a diagram showing a model used for calculating an effective electrode length in each orthogonal direction.

In the optical control device described with reference to FIGS. 2 to 4, it was assumed that the signal electrodes and ground electrode constituting the modulation electrodes have the same electrical loss in each signal electrode. That is to say, it is assumed that the materials of the signal electrodes, the widths or heights of the signal electrodes, and the gaps between the signal electrodes and the ground electrode are the same. Moreover, it is assumed that the physical constant (dielectric constant or dielectric dissipation factor) and shape (thickness, sectional shape) of the substrate having an electro-optic effect is the same in any signal electrode.

However, the propagation loss and impedance change depend on the material of the signal electrode, the width or height of the signal electrode, the gap between the signal electrode and the ground electrode, the kind of material filled in the space between the signal electrode and the ground electrode, and the physical constant (dielectric constant or dielectric dissipation factor) or shape (thickness, sectional shape) of the substrate having an electro-optic effect.

For this reason, by changing the above-described various parameters arbitrarily, it is possible to adjust the propagation loss and impedance. In the present invention, a region where the impedance is adjusted by changing the parameters while reducing the propagation loss is defined as a loss-reduction portion, and similar to the first feature, the sum of effective electrode lengths in orthogonal directions of the loss-reduction portion is configured to be the same in each signal electrode. The sum of the effective electrode lengths in each direction can be similarly calculated from the equations of Formula 1.

However, since the impedance and the propagation loss are affected by the dielectric constant of the substrate, the impedance and the propagation loss reduction amount also change depending on a crystal axis direction of the substrate. In order to compensate for this, attention is paid to the sum of effective electrode lengths of the loss-reduction portion in each of the directions where the dielectric constant is different, for example, in each of the orthogonal directions as described above.

By using the second feature of the present invention, it is possible to achieve a matching of impedance or propagation loss among signal electrodes, thus achieving a high-precision matching of intensities of the modulation signals applied to the acting portions.

By applying the first and second features of the present invention to an optical control device, it is possible to achieve an extremely high-precision matching of timing or intensity of the modulation signal applied to the acting portions of a plurality of signal electrodes. For this reason, the present invention can be suitably applied to various modulation methods such as DQPSK and SSB modulation methods where high-precision optical modulation is required in a wideband of several tens of GHZ or higher, polarization multiplexing, and D8PSK or D16PSK that further divides phase information. Optical control devices for these modulation methods have a plurality of Mach-Zehnder waveguides arranged in parallel, in which each Mach-Zehnder waveguide has a plurality of signal electrodes that supplies electrical signals for modulating optical waves propagating through branch waveguides. Therefore, in such complex modulation methods, a high-accuracy adjustment of optical modulation timing or intensity according to the present invention will be very useful.

Furthermore, by applying the first and second features of the present invention to the optical-path switching device, it is very useful because the optical switching timings and signal intensities can be adjusted in various optical-path switching devices produced by various methods, ranging from small-scale devices with 1-by-2 or 2-by-2 ports to large-scale devices with N-by-N ports.

As described above, according to the present invention, it is possible to provide an optical control device capable of achieving an accurate matching of an interaction timing between electrical signals and optical waves propagating through optical waveguides disposed between a plurality of signal electrodes, a reflection attenuation rate resulting from an impedance mismatch, and a signal voltage resulting from a propagation loss in an optical control device using an anisotropic dielectric substrate.

| REFERENCE NUMERALS | |
|---|---|
| 1, 10: | MAIN MACH-ZEHNDER WAVEGUIDE |
| 2: | MAIN BRANCH WAVEGUIDE |
| 3, 11, 12: | SUB MACH-ZEHNDER WAVEGUIDE (COUPLING WAVEGUIDE) |
| 4, 21, 23: | SIGNAL ELECTRODE |
| 5, 20, 22: | ELECTRODE PAD |

What is claimed is:

1. An optical control device comprising:
an anisotropic dielectric substrate;
modulation electrodes; and
optical waveguides formed on the substrate so as to cause optical waves propagating through the optical waveguides to interact with electrical signals propagating through the modulation electrodes, wherein,
the modulation electrodes include a plurality of signal electrodes and a ground electrode disposed around the signal electrodes,
the plurality of signal electrodes have respective electrode portions which are disposed in directions where a dielectric constant of the substrate is different,
signal electrodes positioned on the same side of the substrate and ranging from signal input terminal portions of the signal electrodes to a point where the interaction between the electrical signals and the optical waves propagating through the optical waveguides starts are used as input-side signal electrode portions, and
the modulation electrodes including the plurality of signal electrodes have matched impedance, and a sum of effective electrode lengths of the input-side signal electrode portions, which are products of physical electrode lengths and effective refractive indices of the electrical signals, is the same in each of the directions where the dielectric constant is different.

2. The optical control device according to claim 1, wherein a sum of physical electrode lengths of the input-side signal electrode portions in the modulation electrodes including the plurality of signal electrodes is the same in each of the directions where the dielectric constant is different.

3. The optical control device according to claim 2, wherein the optical control device has a loss-reduction portion for reducing an electrical loss in at least a part of the input-side signal electrode portions in the modulation electrodes including the plurality of signal electrodes, and
a sum of effective electrode lengths of the loss-reduction portion is the same in each of the directions where the dielectric constant is different.

4. The optical control device according to claim 2, wherein the optical waveguides have such a shape that a plurality of Mach-Zehnder waveguides is arranged in parallel, and
the signal electrodes are electrodes that supply electrical signals for modulating the optical waves propagating through a branch waveguide of each of the Mach-Zehnder waveguides.

5. The optical control device according to claim 2, wherein the optical waves propagating through the optical waveguides interact with the electrical signals propagating through the signal electrodes, thus switching optical path.

6. The optical control device according to claim 1, wherein the optical control device has a loss-reduction portion for reducing an electrical loss in at least a part of the input-side signal electrode portions in the modulation electrodes including the plurality of signal electrodes, and
a sum of effective electrode lengths of the loss-reduction portion is the same in each of the directions where the dielectric constant is different.

7. The optical control device according to claim 6, wherein the optical waveguides have such a shape that a plurality of Mach-Zehnder waveguides is arranged in parallel, and
the signal electrodes are electrodes that supply electrical signals for modulating the optical waves propagating through a branch waveguide of each of the Mach-Zehnder waveguides.

8. The optical control device according to claim 6, wherein the optical waves propagating through the optical waveguides interact with the electrical signals propagating through the signal electrodes, thus switching optical path.

9. The optical control device according to claim 1, wherein the optical waveguides have such a shape that a plurality of Mach-Zehnder waveguides is arranged in parallel, and
the signal electrodes are electrodes that supply electrical signals for modulating the optical waves propagating through a branch waveguide of each of the Mach-Zehnder waveguides.

10. The optical control device according to claim 1, wherein
the optical waves propagating through the optical waveguides interact with the electrical signals propagating through the signal electrodes, thus switching optical path.

* * * * *